US012251799B2

(12) United States Patent
Mangini

(10) Patent No.: US 12,251,799 B2
(45) Date of Patent: Mar. 18, 2025

(54) MULTIPLE-BIT HAND TOOL INCLUDING POWER NUT/BIT DRIVER

(71) Applicant: Klein Tools, Inc., Lincolnshire, IL (US)

(72) Inventor: Christopher Mangini, Arlington, TX (US)

(73) Assignee: Klein Tools, Inc., Lincolnshire, IL (US)

( * ) Notice: Subject to any disclaimer, the term of this patent is extended or adjusted under 35 U.S.C. 154(b) by 331 days.

(21) Appl. No.: 17/721,006

(22) Filed: Apr. 14, 2022

(65) Prior Publication Data

US 2023/0046586 A1 Feb. 16, 2023

Related U.S. Application Data

(60) Provisional application No. 63/233,186, filed on Aug. 13, 2021.

(51) Int. Cl.

*B25B 23/00* (2006.01)
*B25B 15/00* (2006.01)
*B25G 1/08* (2006.01)

(52) U.S. Cl.

CPC .......... *B25B 23/0035* (2013.01); *B25G 1/085* (2013.01); *B25B 15/005* (2013.01); *B25B 15/007* (2013.01); *B25B 15/008* (2013.01)

(58) Field of Classification Search

CPC ............ B25B 23/0035; B25B 23/0042; B25B 15/005; B25B 15/007; B25B 15/008; B25G 1/08; B25G 1/085; B25G 1/063

See application file for complete search history.

(56) References Cited

U.S. PATENT DOCUMENTS 3,023,015 A * 2/1962 Pankow ................ B25B 21/007 279/143
3,114,401 A * 12/1963 Johnson .................. B25B 15/02 81/177.85
4,573,839 A * 3/1986 Finnegan .............. B25B 21/007 408/239 R
5,894,765 A * 4/1999 Anderson ................. B25F 1/02 81/439
5,904,080 A * 5/1999 Anderson ................. B25F 1/02 81/439
6,354,177 B2 * 3/2002 Peters ................... B25B 21/007 81/439
8,621,961 B2 * 1/2014 Burch ..................... B25B 15/02 81/436
8,856,994 B2 * 10/2014 Powers .................. B25G 1/085 81/439

(Continued)

*Primary Examiner* — David B. Thomas

(57) ABSTRACT

A reversible, multiple-bit, hand tool for driving threaded fasteners and nuts includes a handle and a reversible tool holder assembly. The reversible tool holder assembly is insertable into the handle in either of two orientations to present two different ends provide multiple different configurations for driving different types of threaded fasteners and nuts. The reversible tool holder assembly includes a reversible adapter barrel, a first tool holder, a second tool holder, a first reversible bit holder, and a second reversible bit holder. Each of the tool holders can be selectively used as a nut driver with the holder assembly inserted in either orientation in the handle or can be removed from the adapter barrel and used separately as a power bit driver or a power nut driver (PND) that is received in any conventional chuck of a powered rotary tool.

12 Claims, 7 Drawing Sheets

(56) References Cited

U.S. PATENT DOCUMENTS

| | | | | |
|---|---|---|---|---|
| 9,032,847 | B2 * | 5/2015 | Duitsman | B25B 23/0007 81/438 |
| 9,604,350 | B2 * | 3/2017 | Viuf | B23B 31/1079 |
| 11,148,261 | B2 * | 10/2021 | Molina | B25B 23/0035 |
| 2010/0229693 | A1 * | 9/2010 | Chen | B25G 3/22 81/438 |

* cited by examiner

MULTIPLE-BIT HAND TOOL INCLUDING POWER NUT/BIT DRIVER

CROSS-REFERENCE TO RELATED APPLICATIONS

This application claims priority to provisional U.S. patent application Ser. No. 63/233,186 filed Aug. 13, 2021, the entire disclosure of which is incorporated herein by reference.

BACKGROUND OF THE DISCLOSURE

The present disclosure relates to tools, and more particularly, to a multi-purpose hand tools for driving threaded fasteners and nuts, and to power nut and/or bit drivers that can be engaged in chuck of a standard rotary power tool, such as a handheld drill or impact driver.

Repairmen, technicians, and others are frequently required to carry a variety of tools for the various tasks that they are required to perform. As an example, tradesmen often carry both Phillips head and flat head screwdrivers as a rule. Depending on the application, different sized Phillips head or flat head screwdrivers may even be required. For example, a small screw may require, or be adapted to receive, only a small Phillips head bit, such as size #1 head, or the application may involve larger screws that may require, or be adapted to receive, a larger sized Phillips head bit, such as a #2 Phillips head bit. Of course, the same may be true of flat head screws. Different sized flat head bits may be required, depending on the size of the head of the screw. Additionally, other type bits, such as Torx head style bits or square drive bits, may be required for applications involving Torx head or square drive screws. In addition, various sized nut drivers may also be required. For example, 9/16, 3/8, 5/16, 1/4, and 3/16 sized nut drivers may be needed.

In any event, in order to be prepared to handle the various types of screws and nuts that may be encountered, tradesmen are required to carry a multitude of tools. Even though some of the screw or nut driver sizes may be used infrequently, tradesmen still may need to carry all the potential sizes for the screws and nuts that they may encounter, along with all of the other types of tools necessary for their work. It may be difficult and time-consuming for them to gather all of the separate tools that may be needed. It may also be unwieldy and cumbersome to carry all of the tools at the same time that may be required. In addition, it is also costly for a technician to purchase and carry all of the various tools that may be required. Furthermore, tradesmen may need to carry various sized power nut and/or bit drivers to use with a power drill or impact driver.

While conventional multiple bit drivers can reduce the number of tools that a tradesman may have to carry, there is always room for improvement. For example, no conventional multiple bit drivers eliminate the need to carry various sized power nut and/or bit drivers to use with a power drill or impact driver.

BRIEF SUMMARY OF THE DISCLOSURE

According to one feature of this disclosure, a reversible, multiple-bit, hand tool, includes: a handle having a body portion that includes a hollow bore formed at least partially through the body portion; and a reversible tool holder assembly insertable into the hollow bore of the body portion of the handle in either of two orientations to present two different ends extending from the handle. The reversible tool holder assembly includes a reversible adaptor barrel extending longitudinally from a first adapter end to a second adaptor end. The adaptor barrel includes: a first adaptor socket formed in the first adaptor end, and a second adaptor socket formed in the second adapter end. The reversible adaptor barrel is releasably engaged in the hollow bore in either of a first orientation and a second orientation. In the first orientation the first adapter end extends out from the handle and the second adaptor end extends into the handle. In the second orientation the second adapter end extends from the handle and the first adaptor end extends into the handle. The reversible tool holder assembly further includes a first tool holder extending longitudinally from a first shank end to a first socket end, the first tool holder including: a first shank extending from the first shank end toward the first socket end, and a first tool socket extending from the first socket end toward the first shank end. The first shank is releasably engageable in at least one of the first and second adaptor sockets to rotatably couple the first tool holder to the reversible adaptor barrel. The reversible tool holder assembly further includes a second tool holder extending longitudinally from a second shank end to a second socket end, the second tool holder including: a second shank extending from the second shank end toward the second socket end, and a second tool socket extending from the second socket end toward the second shank end. The second shank is releasably engageable in at least one of the first and second adaptor sockets to rotatably couple the second tool holder to the reversible adaptor barrel. The reversible tool holder assembly further includes a first reversible bit holder having a pair of oppositely opening first bit cavities, each first bit cavity adapted to releasably receive a tool bit. The first reversible bit holder is releasably engageable in at least one of the first and second tool sockets to rotatably couple the first reversible bit holder to the at least one of the first and second tool sockets in one orientation with one of the oppositely opening first bit cavities extending from the at least one of the first and second tool sockets and in another orientation with the other of the oppositely opening first bit cavities extending from the at least one of the first and second tool sockets. The reversible tool holder assembly further includes a second reversible bit holder having a pair of oppositely opening second bit cavities, each second bit cavity adapted to releasably receive a tool bit. The second reversible bit holder releasably engageable in at least one of the first and second tool sockets to rotatably couple the second reversible bit holder to the at least one of the first and second tool sockets in one orientation with one of the oppositely opening second bit cavities extending from the at least one of the first and second tool sockets and in another orientation with the other of the oppositely opening second bit cavities extending from the at least one of the first and second tool sockets.

In one feature, the hand tool of further includes four tool bits, each of the four tool bits engageable in at least one of first and second bit cavities to rotatably couple the tool bit with the corresponding one of the first and second reversible bit holders. In a further feature, at least one of the four tool bits is a reversible tool bit that is engageable in the at least one of the first and second bit cavities in either of two orientations to present different ends extending from the at least one of the first and second bit cavities. In yet a further feature, one of the four tool bits is a non-reversible tool bit that is engageable in a single orientation in the at least one of the first and second bit cavities.

According to another feature, the first tool socket is configured to serve as a first sized nut driver and the second tool socket is configured to serve as a second sized nut driver, with the second sized nut driver being a different size than the first sized nut driver.

As another feature, the first sized nut driver is configured to drive a ⅜ inch hex nut, the second sized nut driver is configured to drive a 5/16 inch hex nut, the first reversible bit holder has an outer surface defining a ⅜ inch hexagonal cross-section, and the second reversible pit holder has an outer surface defining a 5/16 inch hexagonal cross-section.

In one feature, the hand tool further includes a detent mechanism engaged between the hollow bore and the reversible barrel adaptor to resist removal of the reversible barrel adaptor from the hollow bore.

According to one feature, the hand tool further includes a detent mechanism engaged between the first shank and the at least one of the first and second adaptor sockets to resist removal of the first shank from the at least one of the first and second adaptor sockets; and another detent mechanism engaged between the second shank and the at least one of the first and second adaptor sockets to resist removal of the second shank from the at least one of the first and second adaptor sockets.

As one feature, the hand tool further includes a detent mechanism engaged between the first reversible bit holder and the at least one of the first and second tool sockets to resist removal of the first reversible bit holder from the at least one of the first and second tool sockets; and another detent mechanism engaged between the second shank and the at least one of the first and second tool sockets to resist removal of the second reversible bit holder from the at least one of the first and second tool sockets.

In one feature, at least one of the first and second reversible bit holders further comprises a magnet located in one of the bit cavities.

According to one feature, each of the shanks has an outer surface defining a ¼ hexagonal cross-section and is configured to be received in a chuck for a powered impact driver.

As one feature, the handle further includes an insert defining at least part of the hollow bore, the insert engaged with the reversible adapter barrel in both the first and second orientations to rotatably couple the reversible adapter barrel with the handle.

DETAILED DESCRIPTION OF PREFERRED EMBODIMENTS

Figure 1:
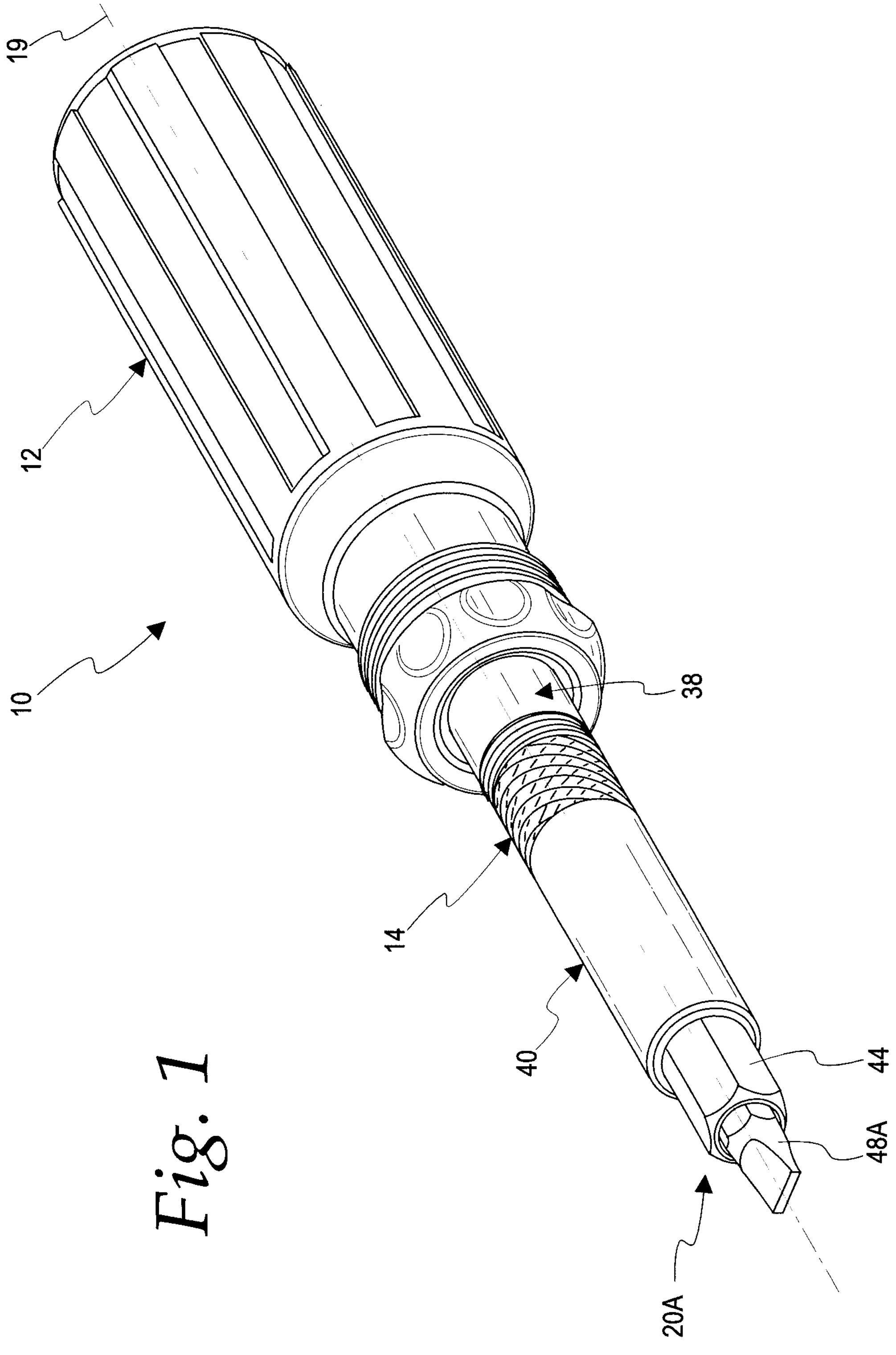
FIG. 1 is a perspective view from the front and side of a multiple-bit hand tool according to this disclosure.
Figure 2:
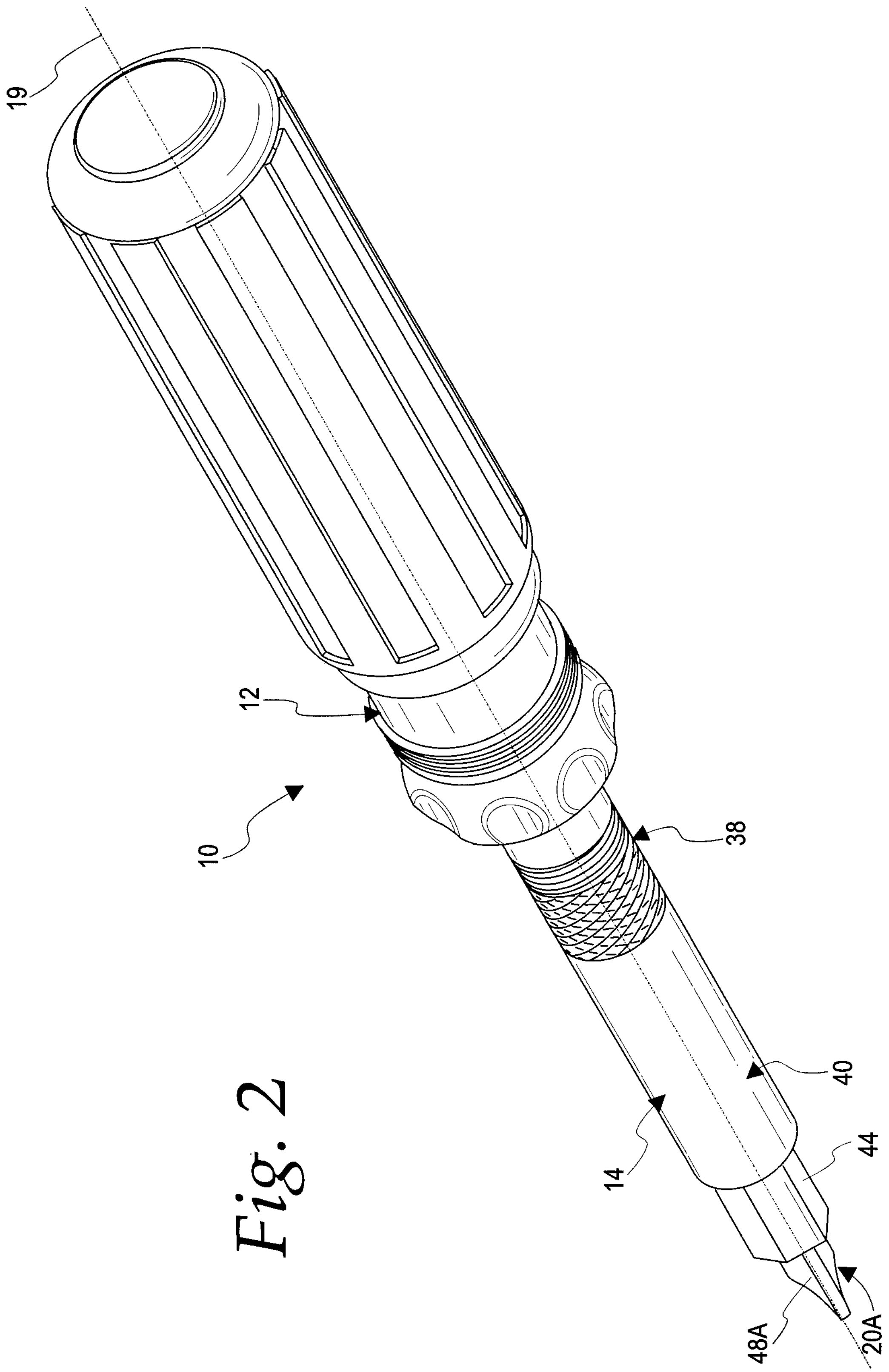
FIG. 2 is a perspective view from the back and side of the hand tool of FIG. 1.
Figure 3:
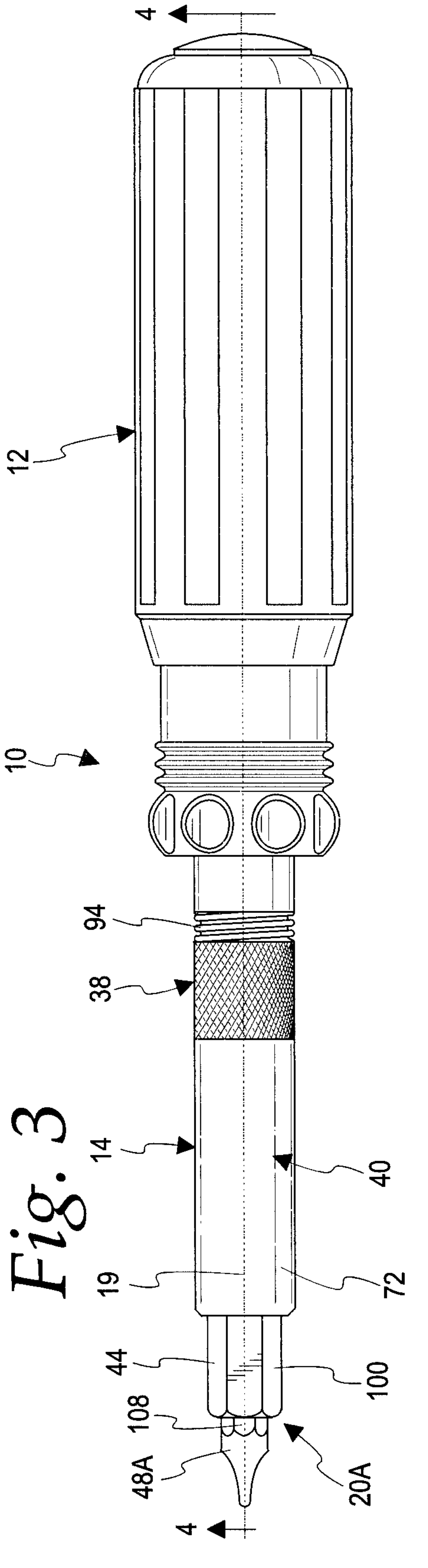
FIG. 3 is a side elevation view of the hand tool of FIGS. 1 and 2.
Figure 4:
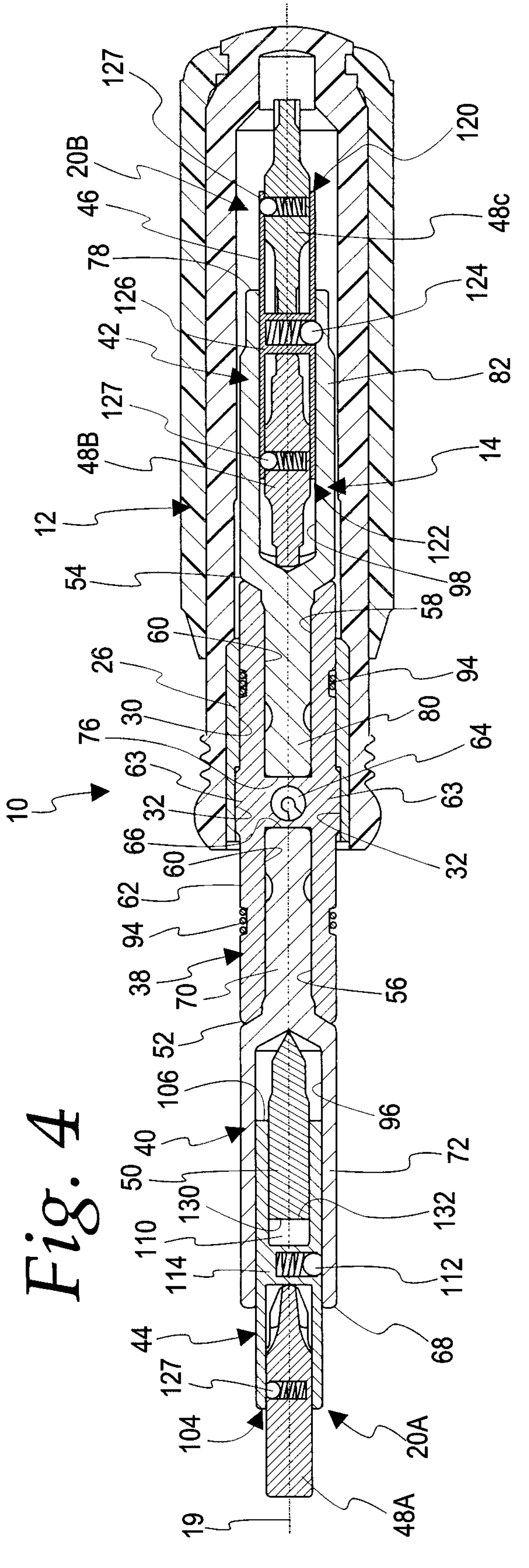
FIG. 4 is a longitudinal section view taken from line 4-4 in FIG. 3.
Figure 5:
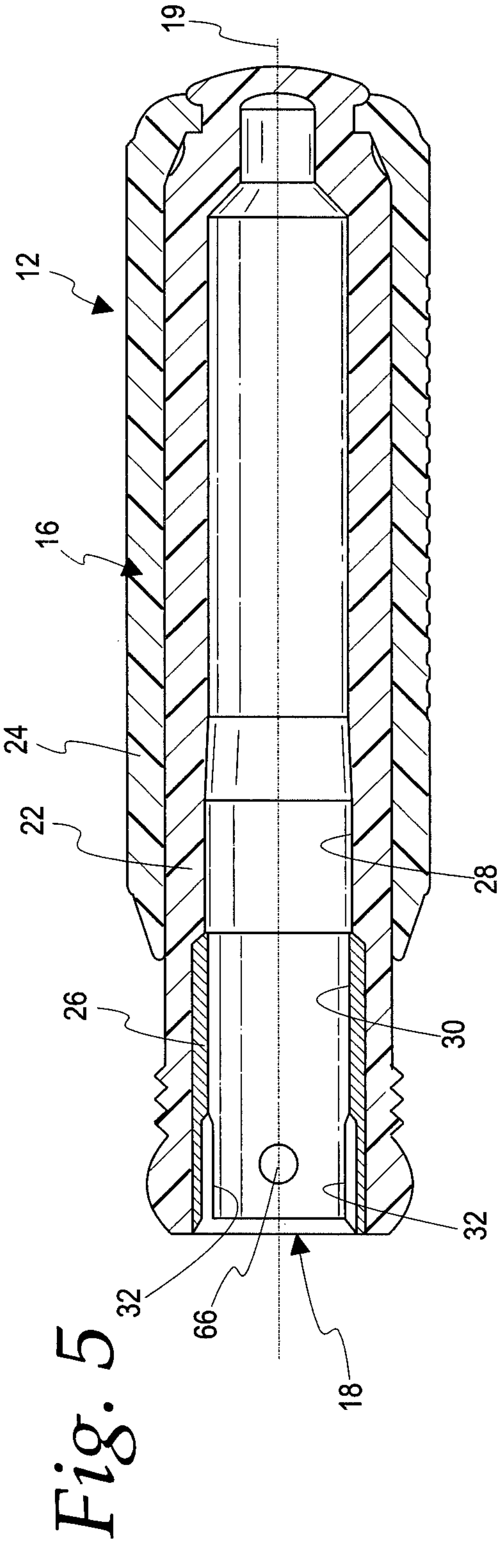
FIG. 5 is an enlarged longitudinal section view of a handle of the hand tool of FIGS. 1-4.

With reference to FIGS. 1-10, a reversible, multiple-bit, hand tool 10 is shown for driving threaded fasteners and nuts. As best seen in FIG. 1-4, the hand tool 10 includes a handle 12 and a reversible tool holder assembly 14. As best seen in FIGS. 4 and 5, the handle 12 includes a body portion 16 and a hollow bore 18 that extends partially through the body portion 16, with the body portion 16 and hollow bore 18 centered on a longitudinal axis 19. The reversible tool holder assembly 14 is insertable into the hollow bore 18 in either of two orientations to present two different ends, shown generally at 20A and 20B, extending from the handle 12 to provide multiple different configurations for driving different types of threaded fasteners and nuts. In both orientations, the assembly 14 is centered on the axis 19.

As best seen in FIG. 5, in the illustrated and preferred embodiment, the body portion 16 of the handle 12 includes a rigid body 22, a grip 24, and a collet 26. The rigid body 22 is molded from a suitable material, typically a suitable plastic and includes a stepped cylindrical bore 28 that defines part of the hollow bore 18. The grip 24 overlays an outer surface of the body 22 is also molded from a suitable material, typically a suitable rubber material. The collet 26 is formed from a suitable metal, typically a suitable stainless steel and is preferably permanently fixed in the handle 12 via a press fit and/or bonding with the rigid body 22 to rotatably couple the collet 26 to the body 22. In this regard the collet 26 may also include a knurling on an outer surface to provide a further rotational couple with the body 22. The collet 26 includes an inwardly facing cylindrical surface 30 that defines a portion of the hollow bore 18, with a pair of axially extending grooves 32, each of which serves as an anti-rotation feature that transfers torque to the tool holder assembly 14 and rotatably couples the handle 12 with the assembly 14. The collet 26 and the surface 30 are centered on the axis 19.

Figure 6:
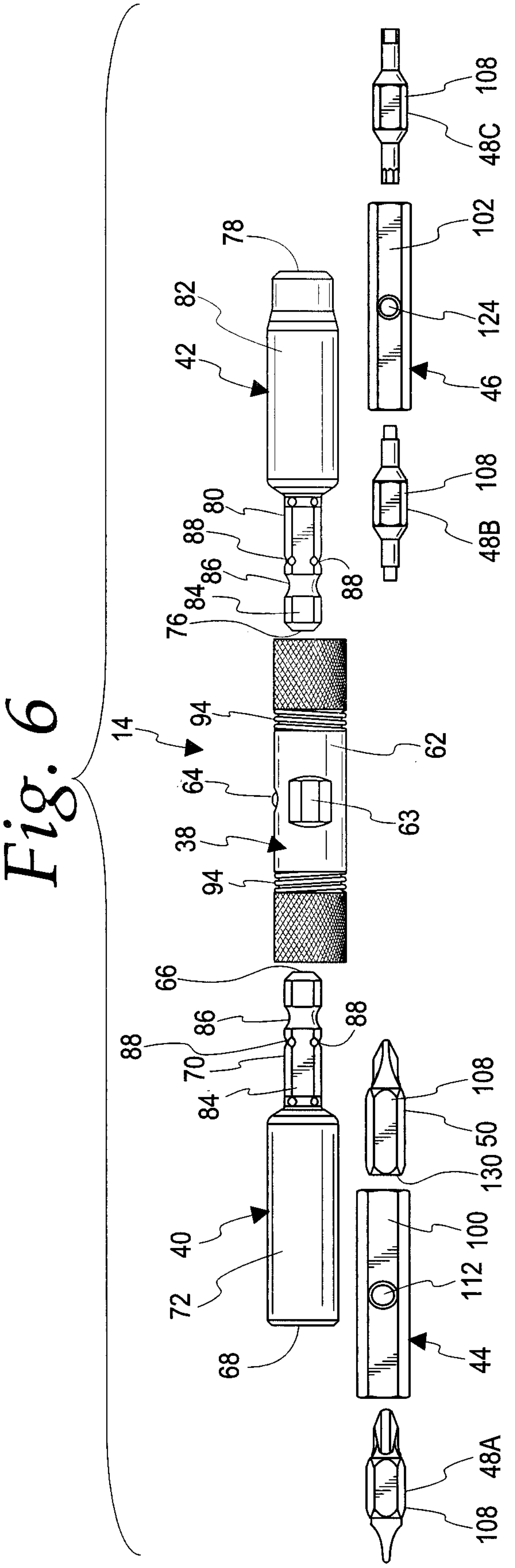
FIG. 6 is an exploded side elevation view of a reversible tool holder assembly of the hand tool of FIGS. 1-4.
Figure 7:
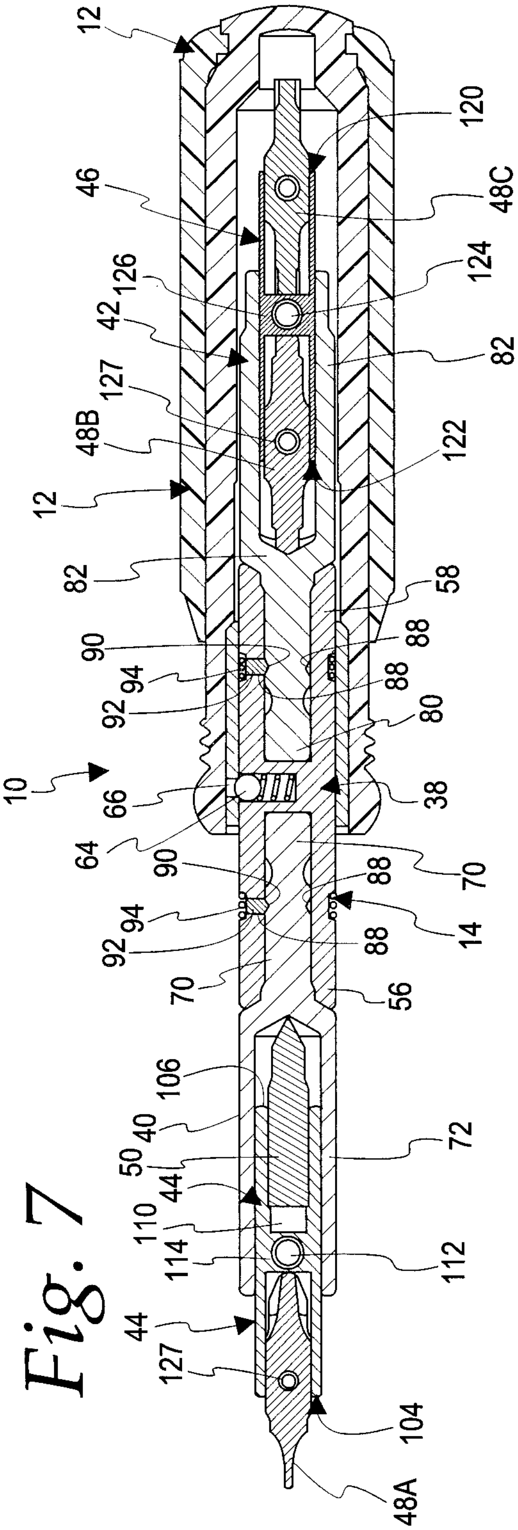
FIG. 7 is a view similar to FIG. 4 but taken from a line that is rotated 90 degrees from line 4-4 in FIG. 3.

As best seen in FIG. 6, the reversible tool holder assembly 14 includes a reversible adapter barrel 38, a first tool holder 40, a second tool holder 42, a first reversible bit holder 44, a second reversible bit holder 46, and three reversible tool bits 48A, 48B, and 48C, and one non-reversible tool bit 50. Each of the components 38, 40, 42, 44, 46, 48A-C, and 50 are made from a suitable material, and will typical be a metallic material, such a suitable steel or stainless steel. As will be discussed in more detail below, the reversible adapter barrel 38 can be releasably engaged in the hollow bore 18 of the handle 12 in two different orientations to extend opposite ends of the barrel 38 from the handle 12, each of the reversible bit holders 44 and 46 can be releasably engaged in a corresponding one of the tool holders 40 and 42 in two different orientations to extend opposite ends of the bit holders 44 and 46 from the corresponding one of the tool holders 40 and 42, and each of the reversible tool bits 48A-C can be releasably engaged in either of the bit holders 44 and 46 in two different orientations to extend opposite ends of each tool bit 48A-C from the bit holders 44 and 46. It should be noted that FIGS. 1-4 and 7 show each of the components 38, 40, 42, 44, 46, and 48A-C in one of their orientations and FIG. 8 shows each of the components 38, 40, 42, 44, 46, and

Figure 8:
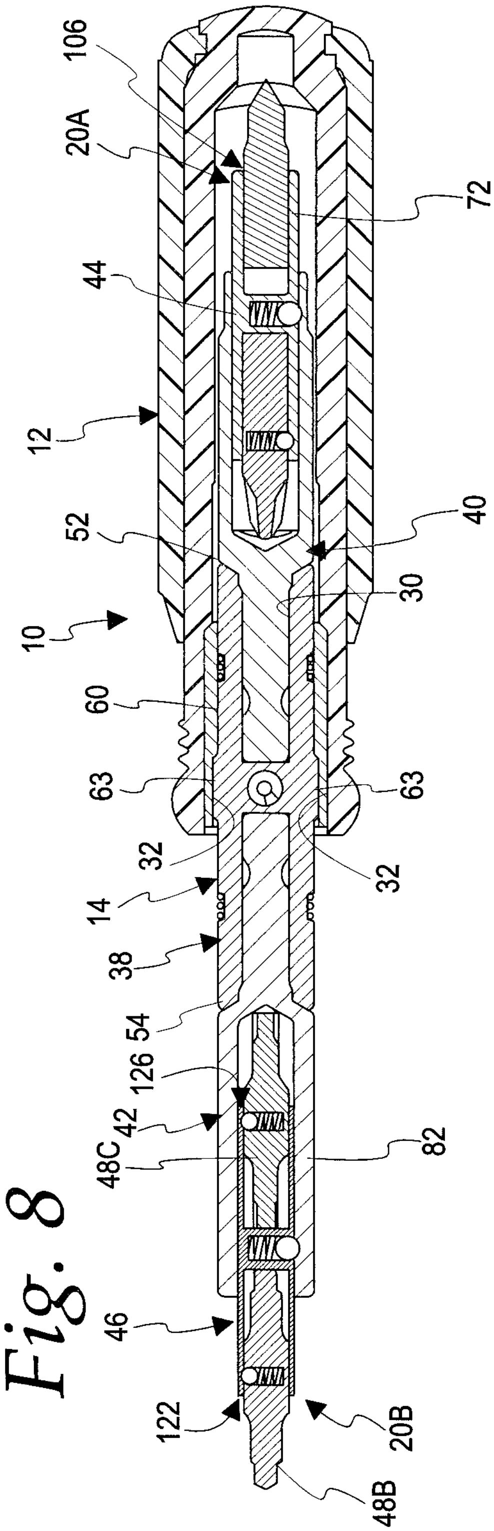
FIG. 8 is a view similar to FIG. 4 but showing several components in a reversed orientation from that shown in FIG. 4.
Figures 9, 10:
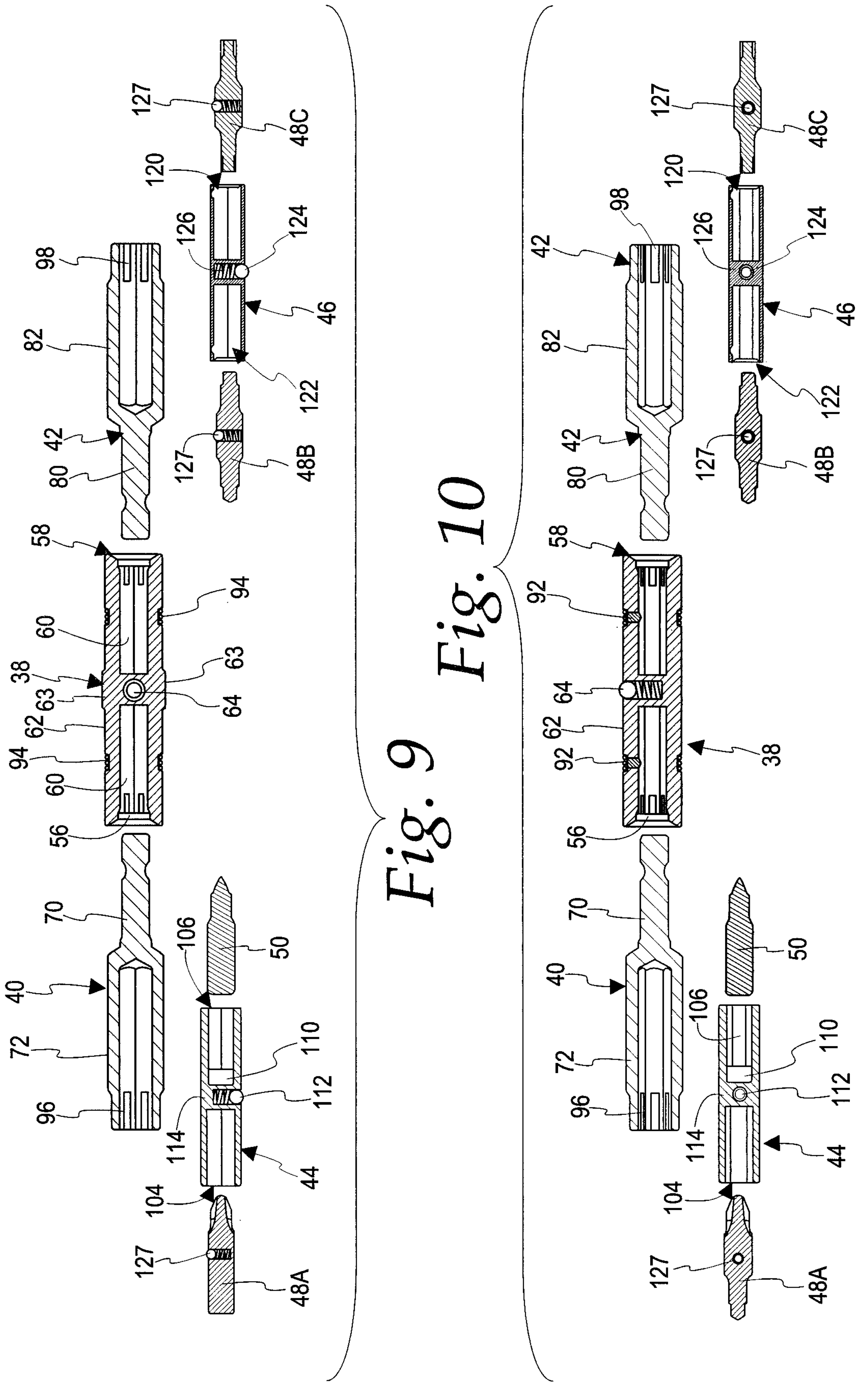
FIG. 9 is an exploded view of selected components shown in FIG. 4.
FIG. 10 is an exploded view of selected components shown in FIG. 8.

48A-C reversed in their other orientation, with the assembly 14 shown in one orientation in FIGS. 1-4 and 7 and in a reversed orientation in FIG. 8. In all of these orientations, the components 38, 40, 42, 44, 46, 48A-C, and 50 are centered on the axis 19.

Each of the bit holders 44 and 46 can be completely removed from each of the tool holders 40 and 42 to allow each of the tool holders 40 and 42 to be selectively used as a nut driver with the assembly 14 inserted in either orientation in the handle 12. Advantageously, each of the tool holders 40 and 42 can be removed from the adapter barrel 38 and used separately as a power bit driver or a power nut driver (PND) that is received in any conventional chuck of a powered rotary tool. In this regard, it is preferred that each of the tool holders 40 and 42, each of the bit holders 44 and 46, and each of the tool bits 48A-C and 50 be configured and made of materials suitable for impact ratings so that they can be driven by an power rotary impact driver.

All of the foregoing features allow for a user to selectively arrange the hand tool 10 in multiple different configurations, with each of the configurations being adapted and/or optimized for a particular type of threaded fastener or nut.

Turning to a more detailed description of the illustrated and preferred embodiments of each of the components of the assembly 14, as best seen in FIG. 4, the reversible adapter barrel 38 extends longitudinally along the axis 19 from a first adapter end 52 to a second adapter end 54, with a first adaptor socket 56 formed in the end 52 and a second adaptor socket 58 formed in the end 54. In preferred embodiment, each of the sockets 56 and 58 includes a drive cavity 60 having a hexagonally shaped cross-section centered on the axis 19 for driving engagement with either of the tool holders 40 and 42. In illustrated and preferred embodiments, the cavity 60 is configured to transfer a drive torque (drive) a standard ¼ hexagonal bit driver shank. The adapter barrel 38 includes a cylindrical outer surface 62 centered on the axis 19 and that is a close fit with the cylindrical surface 30 of the collet 26, with a pair of axially extending ribs 63 formed on the surface 62, with each of the ribs 63 engaged in one of the grooves 32 in the collet 26 to rotationally couple the adapter to the collet 26 and the handle 12 so that torque can be transferred from the handle 12 to the adapter barrel 38 and the rest of the assembly 14. As mentioned above, the adaptor barrel 38 can be releasably engaged in the hollow bore 18 in either of a first orientation and a second orientation. In the first orientation, the end 52 extends out from the handle 12 and the end 54 extends into the handle, with the wings 64 engaged in the grooves 32. In the second orientation, the end 54 extends out from the handle 12 and the end 52 extends into the handle 12, again with the wings 64 engaged in the grooves 32. In the illustrated and preferred embodiment, the barrel 38 further includes a spring-loaded ball detent 64 that releasably engages an recess/bore 66 in the collet 26 to resist removal of the barrel 38 and assembly 14 from the handle 12. It should be noted that in the illustrated and preferred embodiment, the barrel 38 is symmetric about a transverse axis that extends through the ball detent 64.

The first tool holder 40 extends longitudinally along the axis 19 from a first shank end 66 to a first socket end 68. The tool holder 40 includes a first shank 70 extending longitudinally from the end 66 toward the end 68, and a first tool socket 72 extending longitudinally along the axis 19 from the end 68 toward the end 66. The second tool holder 42 extends longitudinally along the axis 19 from a second shank end 76 to a second socket end 78. The tool holder 42 includes a second shank 80 extending longitudinally from the end 76 toward the end 78, and a second tool socket 82 extending longitudinally along the axis 19 from the end 78 toward the end 76. As best seen in FIG. 6, in the illustrated and preferred embodiments, the shanks 70 and 80 are identical to each other, and each of the shanks 70 and 80 has an exterior surface 84 defining a ¼ hexagonal cross-section and is configured to be received in a conventional chuck of a powered rotary tool. In this regard, each of the shanks 70 and 80 includes an annular concave groove 86, as is often typical for power bit drivers and/or power nut drivers, that can be engaged by a detent or other retention feature provided by the handle of a hand tool or the chuck of a powered rotary tool. Additionally, in the preferred embodiments, each of the shanks 70 and 80 includes a plurality of detent notches 88 each of with is configured to closely conform to an engagement tip 90 of a detent pin 92 (best seen in FIG. 7) provided in each of the adaptor sockets 56 and 58 to provide a more accurate and positive releasable retention of the shanks 70 and 80 in the sockets 56 and 58. In this regard, each of the detent pins 92 is guided for translation in a detent through bore 94 provided in each of the sockets 56 and 58, with a helical spring 94 wrapped around an exterior of the corresponding socket 56, 58 and engaging a head of the pin 92 to bias the pin 92 into engagement with corresponding notch 88. In the illustrated and preferred embodiments, the first tool socket 72 is configured to serve as a first sized nut driver 72, and the second tool socket 82 is configured to serve as a second sized nut driver 82 that is a different size than the first sized nut driver. In the illustrated and highly preferred embodiment, the first sized nut driver 72 is configured to drive a ⅜ inch hex nut with an interior surface 96 that defines a hexagonal cross-section, the second sized nut driver is configured to drive a 5/16 inch hex nut with an interior surface 98 that defines a hexagonal cross-section, the first reversible bit holder 44 has an outer surface 100 (best seen in FIG. 6) defining a ⅜ inch hexagonal cross-section that conforms to the surface 96, and the second reversible bit holder 46 has an outer surface 102 (best seen in FIG. 6) defining a 5/16 inch hexagonal cross-section that conforms to the surface 98.

The first reversible bit holder 44 includes a pair of oppositely opening bit cavities 104 and 106, with each bit cavity 104, 106 configured to releasably receive one of the tool bits 48A-C or 50. The bit cavities 104 and 106 extend longitudinally along the axis 19 and are centered on the axis 19. The bit holder 44 is releasably engageable in the first tool socket 72 to rotatably couple the bit holder 44 to the tool socket 72 in either one of a first orientation and a second orientation. In the first orientation, the bit cavity 104 extends from the tool socket 72 and in the second orientation the bit cavity 106 extends from the tool socket 72. In the illustrated and preferred embodiment, each of the bit cavities 104 and 106 define a hexagonal shaped cross-section that is configured to rotatably couple with a hexagonally shaped exterior surface 108 on each of the tool bits 48A-C and 50. In this regard, it is preferred that each of the surfaces 108 define a ¼ inch hexagonal cross-section and that each of the bit cavities 104 and 106 have a corresponding shape to receive the surfaces 108. As illustrated, it is also preferred that a magnet 110 be fixed in the bit cavity 106 to retain the tool bit 50 in the cavity 106 via magnetic force. If is further preferred that a spring-loaded ball detent 112 be provided in a centrally located portion 114 of the holder 44 to extend radially outward from one of the flats defined by the surface 100 to engage a flat defined by the surface 96 to resist removal of the holder 44 from the tool socket 72.

The second reversible bit holder 46 includes a pair of oppositely opening bit cavities 120 and 122, with each bit cavity 120, 122 configured to releasably receive one of the tool bits 48A-C or 50. The bit cavities 120 and 122 extend longitudinally along the axis 19 and are centered on the axis 19. The bit holder 46 is releasably engageable in the second tool socket 82 to rotatably couple the bit holder 46 to the tool socket 82 in either one of a first orientation and a second orientation. In the first orientation, the bit cavity 120 extends from the tool socket 82 and in the second orientation the bit cavity 122 extends from the tool socket 82. In the illustrated and preferred embodiment, each of the bit cavities 120 and 122 define a hexagonal shaped cross-section that is configured to rotatably couple with a hexagonally shaped exterior surface 108 on each of the tool bits 48A-C and 50. As noted above, it is preferred that each of the surfaces 108 define a ¼ inch hexagonal cross-section and that each of the bit cavities 120 and 122 have a corresponding shape to receive the surfaces 108. As with the bit holder 44, it is preferred that a spring-loaded ball detent 124 be provided in a centrally located portion 126 of the holder 46 to extend radially outward from one of the flats defined by the surface 102 to engage a flat defined by the surface 98 to resist removal of the holder 46 from the tool socket 82. It should be noted that in the illustrated and preferred embodiment, the bit holder 46 is symmetric about a transverse axis that extends through the ball detent 124.

In the illustrated and preferred embodiment, each of the tool bits 48A-C is engageable in each of the bit cavities 104, 106, 120, and 122 in either of two orientations to present different bit tips/ends extending from the bit cavity 104, 106, 120, and 122. In the illustrated and preferred embodiments, each of the tool bits 48A-C includes a spring-loaded ball detent 127 to engage each of the interior surfaces of the bit cavities 104, 106, 120, and 122 to resist removal of the tool bits 48A-C from the bit cavity 104, 106, 120, and 122 into which it is inserted. The non-reversible tool bit 50 preferably has a flat end surface 130 that engages against a flat surface 132 on the magnet 110 to provide optimized retention via the magnetic force. While any suitable selection of fastener head engaging tips may be provided on the tool bits 48A-C and 50, in the illustrated embodiment, the tool bit 48A has a flat/blade tip on one end and a Philips head tip on the other end, the tool bit 50 has a different size Philips head tip on its end, the tool bit 48B has a first size square drive on one end and a larger size square drive on the other end, and the tool bit 48C has a first size Torx drive on one end and a larger size Torx drive on the other end.

Figure 11:
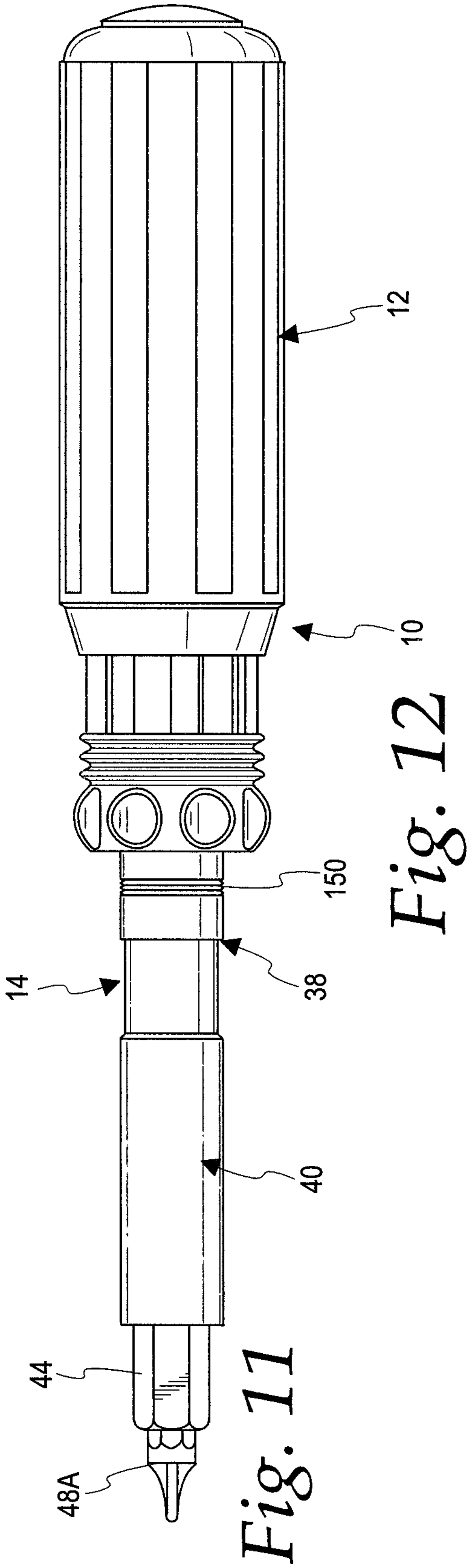
FIG. 11 is a side elevation view showing a slightly modified embodiment of the hand tool of FIGS. 1-10.
Figure 12:
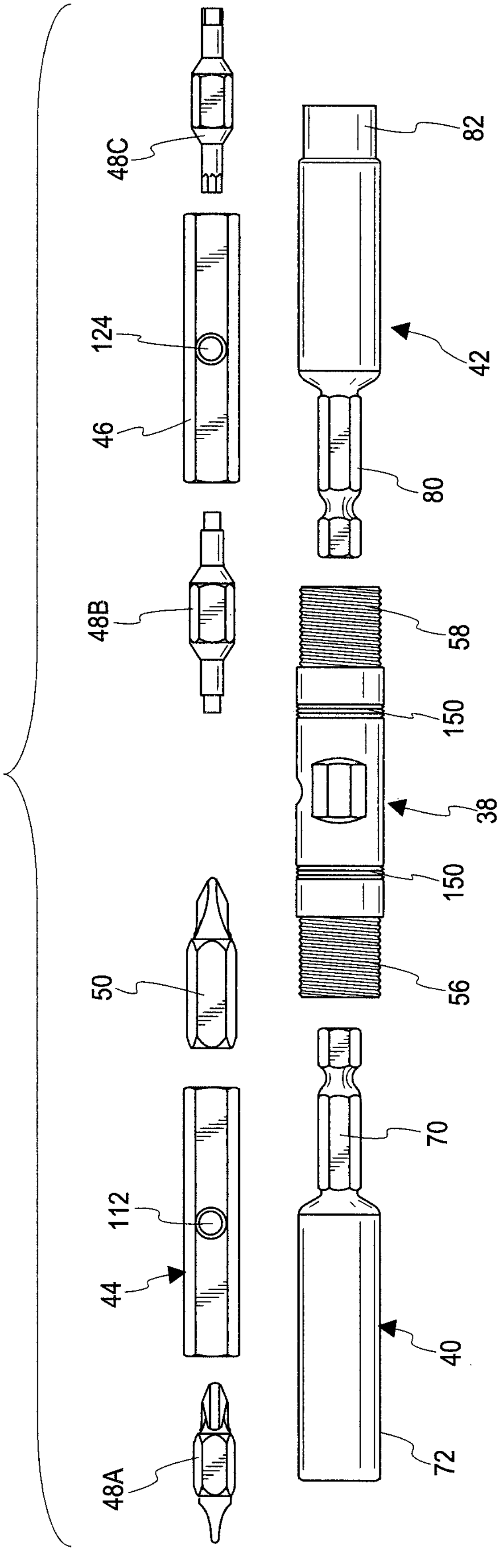
FIG. 12 is an exploded side elevation view of the reversible tool holder assembly of the embodiment shown in FIG. 11.

FIGS. 11 and 12 shown a slightly modified embodiment of the hand tool 10 wherein the shanks 70 and 80 do not include the detent notches 88 and the sockets 56 and 58 do not include the detent pins 92, but do include ball detents (not shown) that engage the grooves 86 and that are each preloaded by a helical spring 150 wrapped around an exterior of the corresponding socket 56, 58.

Preferred embodiments of the inventive concepts are described herein, including the best mode known to the inventor(s) for carrying out the inventive concepts. Variations of those preferred embodiments will become apparent to those of ordinary skill in the art upon reading the foregoing description. The inventor(s) expect skilled artisans to employ such variations as appropriate, and the inventor(s) intend that the inventive concepts can be practiced otherwise than as specifically described herein. Accordingly, the inventive concepts disclosed herein include all modifications and equivalents of the subject matter recited in the claims appended hereto as permitted by applicable law. Moreover, any combination of the above-described elements and features in all possible variations thereof is encompassed by the inventive concepts unless otherwise indicated herein or otherwise clearly contradicted by context. Further in this regard, while highly preferred forms of the hand tool 10 are shown in the figures, it should be understood that this disclosure anticipates variations in the specific details of each of the disclosed components and features of the hand tool 10 and that no limitation to a specific form, configuration, or detail is intended unless expressly and specifically recited in an appended claim.

For example, while specific and preferred forms have been shown for the handle 12, other handle constructions may be desired, including for example, handle constructions that do not include a grip 24 and/or that form the features 30 and 32 directly in the ridged body 22, or that include different configurations for the features 30 and 32, such as a non-cylindrical bore and/or a different type of anti-rotation feature 32. As another example, while specific types of detents have been shown and described herein, in some applications it may be desirable for other types of detents to be used and/or for some or all of the detents to be eliminated. As another example, while the barrel 38 and the bit holder 46 have been shown and described as being symmetrical about a transverse axis centered on their respective detents, in some applications it may be desirable for one or both of these components to be non-symmetrical about the respective transverse axis. As another example, while the several components have been shown and described as providing hexagonal cross-sections, in some applications it may be desirable for other cross sections to be provided, such as for example, square cross-sections, triangular cross-sections, or oval cross-sections. Furthermore, while preferred sizes have been described for a number of features (for example, ¼ inch, ⅜ inch, 5/16 inch), other sizes may be desired depending upon the particular application.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. The use of any and all examples, or exemplary language (e.g., "such as") provided herein, is intended merely to better illuminate the inventive concepts disclosed herein and does not pose a limitation on the scope of any invention unless expressly claimed. No language in the specification should be construed as indicating any non-claimed element as essential to the practice of the inventive concepts disclosed herein.

All references, including publications, patent applications, and patents, cited herein are hereby incorporated by reference to the same extent as if each reference were individually and specifically indicated to be incorporated by reference and were set forth in its entirety herein.

The following are examples of features that could be claimed from this disclosure. However, it should be understood that the inventive concepts disclosed herein do not require each of the features discussed below or above, may include any combination of the features discussed herein, and may include features not specifically discussed below.

1. A reversible, multiple-bit, hand tool, comprising:

a handle having a body portion that includes a hollow bore formed at least partially through the body portion;

a reversible tool holder assembly insertable into the hollow bore of the body portion of the handle in either of two orientations to present two different ends extending from the handle, the reversible tool holder assembly comprising:

a reversible adaptor barrel extending longitudinally from a first adapter end to a second adaptor end, the adaptor barrel including:

a first adaptor socket formed in the first adaptor end, and a second adaptor socket formed in the second adapter end, the reversible adaptor barrel releasably engaged in the hollow bore in either of a first orientation and a second orientation, in the first orientation the first adapter end extends out from the handle and the second adaptor end extends into the handle, in the second orientation the second adapter end extends from the handle and the first adaptor end extends into the handle;

a first tool holder extending longitudinally from a first shank end to a first socket end, the first tool holder including:

a first shank extending from the first shank end toward the first socket end, and a first tool socket extending from the first socket end toward the first shank end, the first shank releasably engageable in at least one of the first and second adaptor sockets to rotatably couple the first tool holder to the reversible adaptor barrel;

a second tool holder extending longitudinally from a second shank end to a second socket end, the second tool holder including:

a second shank extending from the second shank end toward the second socket end, and a second tool socket extending from the second socket end toward the second shank end, the second shank releasably engageable in at least one of the first and second adaptor sockets to rotatably couple the second tool holder to the reversible adaptor barrel;

a first reversible bit holder having a pair of oppositely opening first bit cavities, each first bit cavity adapted to releasably receive a tool bit, the first reversible bit holder releasably engageable in at least one of the first and second tool sockets to rotatably couple the first reversible bit holder to the at least one of the first and second tool sockets in one orientation with one of the oppositely opening first bit cavities extending from the at least one of the first and second tool sockets and in another orientation with the other of the oppositely opening first bit cavities extending from the at least one of the first and second tool sockets; and a second reversible bit holder having a pair of oppositely opening second bit cavities, each second bit cavity adapted to releasably receive a tool bit, the second reversible bit holder releasably engageable in at least one of the first and second tool sockets to rotatably couple the second reversible bit holder to the at least one of the first and second tool sockets in one orientation with one of the oppositely opening second bit cavities extending from the at least one of the first and second tool sockets and in another orientation with the other of the oppositely opening second bit cavities extending from the at least one of the first and second tool sockets.

2. The hand tool of claim f further comprising four tool bits, each of the four tool bits engageable in at least one of first and second bit cavities to rotatably couple the tool bit with the corresponding one of the first and second reversible bit holders.

3. The hand tool of claim 2 wherein at least one of the four tool bits is a reversible tool bit that is engageable in the at least one of the first and second bit cavities in either of two orientations to present different ends extending from the at least one of the first and second bit cavities.

4. The hand tool of claim 3 wherein one of the four tool bits is a non-reversible tool bit that is engageable in a single orientation in the at least one of the first and second bit cavities.

5. The hand tool of claim 1 wherein the first tool socket is configured to serve as a first sized nut driver and the second tool socket is configured to serve as a second sized nut driver, with the second sized nut driver being a different size than the first sized nut driver.

6. The hand tool of claim 1 wherein the first sized nut driver is configured to drive a ⅜ inch hex nut, the second sized nut driver is configured to drive a 5⁄16 inch hex nut, the first reversible bit holder has an outer surface defining a ⅜ inch hexagonal cross-section, and the second reversible pit holder has an outer surface defining a 5⁄16 inch hexagonal cross-section.

7. The hand tool of claim 1 further comprising a detent mechanism engaged between the hollow bore and the reversible barrel adaptor to resist removal of the reversible barrel adaptor from the hollow bore.

8. The hand tool of claim 1 further comprising:

a detent mechanism engaged between the first shank and the at least one of the first and second adaptor sockets to resist removal of the first shank from the at least one of the first and second adaptor sockets; and another detent mechanism engaged between the second shank and the at least one of the first and second adaptor sockets to resist removal of the second shank from the at least one of the first and second adaptor sockets.

9. The hand tool of claim 1 further comprising:

a detent mechanism engaged between the first reversible bit holder and the at least one of the first and second tool sockets to resist removal of the first reversible bit holder from the at least one of the first and second tool sockets; and another detent mechanism engaged between the second shank and the at least one of the first and second tool sockets to resist removal of the second reversible bit holder from the at least one of the first and second tool sockets.

10. The hand tool of claim 1 wherein at least one of the first and second reversible bit holders further comprises a magnet located in one of the bit cavities.

11. The hand tool of claim 1 wherein each of the shanks has an outer surface defining a ¼ hexagonal cross-section and is configured to be received in a chuck for a powered impact driver.

12. The hand tool of claim 1 wherein the handle further comprises an insert defining at least part of the hollow bore, the insert engaged with the reversible adapter barrel in both the first and second orientations to rotatably couple the reversible adapter barrel with the handle.

The invention claimed is:

1. A reversible, multiple-bit, hand tool, comprising:

a handle having a body portion that includes a hollow bore formed at least partially through the body portion;

a reversible tool holder assembly insertable into the hollow bore of the body portion of the handle in either of two orientations to present two different ends extending from the handle, the reversible tool holder assembly comprising:

a reversible adaptor barrel extending longitudinally from a first adapter end to a second adaptor end, the adaptor barrel including:

a first adaptor socket formed in the first adaptor end, and a second adaptor socket formed in the second adapter end, the reversible adaptor barrel releasably engaged in the hollow bore in either of a first orientation and a second orientation, in the first orientation the first adapter end extends out from the handle and the second adaptor end extends into the handle, in the second orientation the second adapter end extends from the handle and the first adaptor end extends into the handle;

a first tool holder extending longitudinally from a first shank end to a first socket end, the first tool holder including:

a first shank extending from the first shank end toward the first socket end, and a first tool socket extending from the first socket end toward the first shank end, the first shank releasably engageable in at least one of the first and second adaptor sockets to rotatably couple the first tool holder to the reversible adaptor barrel;

a second tool holder extending longitudinally from a second shank end to a second socket end, the second tool holder including;

a second shank extending from the second shank end toward the second socket end, and a second tool socket extending from the second socket end toward the second shank end, the second shank releasably engageable in at least one of the first and second adaptor sockets to rotatably couple the second tool holder to the reversible adaptor barrel;

a first reversible bit holder having a pair of oppositely opening first bit cavities, each first bit cavity adapted to releasably receive a tool bit, the first reversible bit holder releasably engageable in at least one of the first and second tool sockets to rotatably couple the first reversible bit holder to the at least one of the first and second tool sockets in one orientation with one of the oppositely opening first bit cavities extending from the at least one of the first and second tool sockets and in another orientation with the other of the oppositely opening first bit cavities extending from the at least one of the first and second tool sockets; and a second reversible bit holder having a pair of oppositely opening second bit cavities, each second bit cavity adapted to releasably receive a tool bit, the second reversible bit holder releasably engageable in at least one of the first and second tool sockets to rotatably couple the second reversible bit holder to the at least one of the first and second tool sockets in one orientation with one of the oppositely opening second bit cavities extending from the at least one of the first and second tool sockets and in another orientation with the other of the oppositely opening second bit cavities extending from the at least one of the first and second tool sockets.

2. The hand tool of claim 1 further comprising four tool bits, each of the four tool bits engageable in at least one of first and second bit cavities to rotatably couple the tool bit with the corresponding one of the first and second reversible bit holders.

3. The hand tool of claim 2 wherein at least one of the four tool bits is a reversible tool bit that is engageable in the at least one of the first and second bit cavities in either of two orientations to present different ends extending from the at least one of the first and second bit cavities.

4. The hand tool of claim 3 wherein one of the four tool bits is a non-reversible tool bit that is engageable in a single orientation in the at least one of the first and second bit cavities.

5. The hand tool of claim 1 wherein the first tool socket is configured to serve as a first sized nut driver and the second tool socket is configured to serve as a second sized nut driver, with the second sized nut driver being a different size than the first sized nut driver.

6. The hand tool of claim 1 wherein the first sized nut driver is configured to drive a ⅜ inch hex nut, the second sized nut driver is configured to drive a 5/16 inch hex nut, the first reversible bit holder has an outer surface defining a ⅜ inch hexagonal cross-section, and the second reversible pit holder has an outer surface defining a 5/16 inch hexagonal cross-section.

7. The hand tool of claim 1 further comprising a detent mechanism engaged between the hollow bore and the reversible barrel adaptor to resist removal of the reversible barrel adaptor from the hollow bore.

8. The hand tool of claim 1 further comprising;

a detent mechanism engaged between the first shank and the at least one of the first and second adaptor sockets to resist removal of the first shank from the at least one of the first and second adaptor sockets; and another detent mechanism engaged between the second shank and the at least one of the first and second adaptor sockets to resist removal of the second shank from the at least one of the first and second adaptor sockets.

9. The hand tool of claim 1 further comprising:

a detent mechanism engaged between the first reversible bit holder and the at least one of the first and second tool sockets to resist removal of the first reversible bit holder from the at least one of the first and second tool sockets; and another detent mechanism engaged between the second shank and the at least one of the first and second tool sockets to resist removal of the second reversible bit holder from the at least one of the first and second tool sockets.

10. The hand tool of claim 1 wherein at least one of the first and second reversible bit holders further comprises a magnet located in one of the bit cavities.

11. The hand tool of claim 1 wherein each of the shanks has an outer surface defining a ¼ hexagonal cross-section and is configured to be received in a chuck for a powered impact driver.

12. The hand tool of claim 1 wherein the handle further comprises an insert defining at least part of the hollow bore, the insert engaged with the reversible adapter barrel in both the first and second orientations to rotatably couple the reversible adapter barrel with the handle.

* * * * *